United States Patent [19]

Nitsch et al.

[11] Patent Number: 4,647,190

[45] Date of Patent: Mar. 3, 1987

[54] COPIER FOR PHOTOGRAPHIC ORIGINALS HAVING DIFFERENT SIZES

[75] Inventors: Wilhelm Nitsch, Munich; Gerhard Benker, Pullach, both of Fed. Rep. of Germany

[73] Assignee: AGFA-Gevaert Aktiengesellschaft, Leverkusen, Fed. Rep. of Germany

[21] Appl. No.: 666,352

[22] Filed: Oct. 30, 1984

[30] Foreign Application Priority Data

Nov. 4, 1983 [DE] Fed. Rep. of Germany ....... 3339991

[51] Int. Cl.⁴ .............................................. G03B 27/52
[52] U.S. Cl. ................................... 355/55; 355/14 C; 355/75
[58] Field of Search ..................... 355/55, 14 C, 76, 75

[56] References Cited

U.S. PATENT DOCUMENTS

| | | |
|---|---|---|
| 4,009,383 | 2/1977 | Beier . |
| 4,186,299 | 1/1980 | Batchelor ........................... 355/14 C |
| 4,236,815 | 12/1980 | Anderson et al. . |
| 4,240,744 | 12/1980 | Rapp et al. ............................. 355/75 |
| 4,277,165 | 7/1981 | Wada et al. ............................ 355/55 |
| 4,396,281 | 8/1983 | Okabe et al. ........................... 355/76 |
| 4,453,821 | 6/1984 | Smith ............................... 355/14 C |
| 4,474,460 | 10/1984 | Suzuki ................................... 355/55 |

FOREIGN PATENT DOCUMENTS 1797492 9/1976 Fed. Rep. of Germany .

*Primary Examiner*—Monroe H. Hayes
*Attorney, Agent, or Firm*—Peter K. Kontler

[57] ABSTRACT

A copier is designed to copy negatives of different sizes onto copying material of different widths. The negatives and copying material are supplied from rolls. The copier includes the following manually controlled components: (i) a set of interchangeable film guides which are used at a scanning station and are slotted to permit photoelectric scanning of the negatives; (ii) a set of interchangeable masks for masking the negatives during copying; (iii) a set of light shafts for illuminating the negatives during copying; and (iv) a movable guide unit for the copying material. A computer associated with the copier is arranged to receive signals indicative of the following manually obtained settings: (a) the type of dimensions of the particular film guide installed in the copier; (b) the type of dimensions of the particular film mask installed in the copier; (c) the type of light shaft installed in the copier or the cross-sectional area of the outlet aperture for the light beam; and (d) the position of the guide unit for the copying material which is related to the width of the latter. The copier further includes a motorized mask for regulating the length of copying material to be exposed, and an adjustable objective having motorized lens elements. The motors for the motorized mask and the lens elements are controlled by the computer. The computer has a memory which stores all possible combinations of settings for the manually controlled and motorized components. When the size of a negative to be copied changes, these components are adjusted for the new size. The manually controlled components are adjusted first. Prior to adjustment of the motorized components, the computer checks the settings of the manually controlled components against the stored combinations of settings to ascertain whether the particular combination of manual settings is possible.

13 Claims, 2 Drawing Figures

COPIER FOR PHOTOGRAPHIC ORIGINALS HAVING DIFFERENT SIZES

BACKGROUND OF THE INVENTION

The invention relates generally to a copier.

More particularly, the invention relates to a photographic copier, especially a copier of the type in which the originals and the copying material are supplied from rolls.

A known photographic copier of this type is designed to copy photographic originals, e.g. negatives, having different widths onto bands of copying material which likewise have different widths. The copier is provided with guide means for the originals as well as the copying material. Each guide means may consist of a set of interchangeable guides which are dimensioned for different widths. Alternatively, each guide means may consist of a single guide which is movably mounted in the copier so that it may assume different positions for different widths. The copier further has an adjustable objective, as well as means for regulating the lengths of the images of the originals.

Such copiers, which find widespread application, are marketed in various forms. As a rule, adjustment of a copier of this type assumes a knowledge of which copying material is to be used for originals having given dimensions. Consequently, when the copier is to be adjusted for a particular original, the required width of the copying material or paper is known, as are the dimensions of the original which constitute an important parameter for photoelectric scanning of the original. Also known is the length of copying material to be exposed, and the cross section of the reflector shaft or tube which will provide optimum illumination of the original. Furthermore, the magnification desired from the objective is known. In this regard, either of two types of adjustable objectives may be employed. One type of objective has a variable focal length. The other type has a fixed focal length and is mounted for movement towards and away from the original and, hence, towards and away from the copying material.

The number of adjustments is generally large since an adjustment is usually required for each of the parameters outlined above. In a simple copier, all of the adjustments are performed manually which carries with it the risk of an error. This risk is compounded by the fact that the error may occur in the darkened portion of the copier which cannot be observed during operation.

Various copiers are known in which some of the adjustments are perform automatically. For instance, the German Pat. No. 17 97 492, which corresponds to the U.S. Pat. No. 3,488,779 discloses a copier which is designed in such a manner that the intensity of illumination, the compensation for the size of the original, the mask for the copying material, and the length of copying material to be exposed are all adjusted automatically via suitable adjusting elements in response to installation of a mask for the original. However, conventional copiers having motorized adjusting elements are extremely expensive. In this regard, it is frequently cheaper to provide for interchange of relatively simple parts, instead of motorized adjustment of such parts, in order to adapt a copier to originals of different sizes. The construction of the known motorized copiers does not, however, permit the interchange of parts.

OBJECTS AND SUMMARY OF THE INVENTION

It is an object of the invention to provide a copier which is designed in such a manner that the chances of error during adjustment are smaller than in a conventional copier of the type in which all adjustments are performed manually.

Another object of the invention is to provide a copier which may be constructed at a more reasonable cost than conventional motorized copiers.

An additional object of the invention is to provide a photographic copier of the general character described above which may be constructed at a reasonable cost yet may be adjusted with a high degree of reliability.

A further object of the invention is to provide a copying method which enables a copier to be adjusted with relatively little risk of error.

The preceding objects, as well as others which will become apparent as the description proceeds, are achieved by the invention.

One aspect of the invention resides in a copier for originals, particularly photographic originals such as negatives, having a range of sizes. The copier has a first parameter and a second parameter each of which has different magnitudes for different sizes. Examples of such parameters are: (i) the dimensions or position of a guide for an original to be copied; (ii) the dimensions or position of a guide for the copying material or paper on which an image of the original is to be formed; (iii) the dimensions or position of a means for regulating the length of copying material to be exposed; and (iv) the magnification to be achieved with an objective. The copier comprises the following:

(a) Adjusting means for adjusting the magnitude of the first parameter and the magnitude of the second parameter when an original of predetermined size is to be copied. The adjusting means includes manually controlled first means for changing the magnitude of the first parameter, and automatically regulated second means for changing the magnitude of the second parameter. The first means is provided with indicator means designed to generate an indicator signal representative of the selected magnitude of the first parameter. By way of example, the adjusting means may include one or more of the following: (i) a set of interchangeable guides for the originals or, alternatively, a single guide which is movably mounted in the copier so that it may assume different positions; (ii) a set of interchangeable guides for the copying material or, alternatively, a single guide which is movably mounted in the copier so that it may assume different positions; (iii) means for regulating the length of copying material to be exposed; and (iv) an adjustable objective.

(b) Computer means arranged to receive the indicator signal from the first means upon manipulation of the latter so as to obtain a predetermined magnitude of the first parameter. The computer means is designed to ascertain whether the predetermined magnitude of the first parameter is correct for the predetermined size of the original to be copied. The computer means is further designed such that, when the predetermined magnitude of the first parameter is correct, the computer means enables and controls manipulation of the second means so as to obtain a predetermined magnitude of the second parameter which is correct for the predetermined size of the original to be copied. The computer means is also designed to generate a warning signal when the predetermined magnitude of the first parameter is incorrect for the predetermined size of the original The copier may be of the type in which the originals and the copying material are supplied from rolls. To this end, the copier may be provided with support means for rotatably supporting rolls of originals, and conveying means for advancing a roll of originals through a copying station by unwinding the originals upstream and rewinding the originals downstream of the copying station. The copier may be further provided with additional support means designed to rotatably support rolls of copying material, and additional conveying means for advancing a roll of copying material through the copying station by unwinding the copying material upstream and rewinding the copying material downstream of the copying station.

The copier is preferably designed to permit copying of originals having different sizes onto bands of copying material having different widths.

The copier may have a plurality of first parameters each of which has different magnitudes for different sizes, as well as a plurality of second parameters each of which has different magnitudes for different sizes. In this case, the adjusting means comprises a plurality of manually controlled first means each of which functions to change the magnitude of a respective first parameter, and a plurality of automatically regulated second means each of which functions to change the magnitude of a respective second parameter. Each of the first means is provided with indicator means designed to generate an indicator signal representative of the selected magnitude of the respective first parameter. The computer means is here arranged to receive an indicator signal from each of the indicator means upon manipulation of the respective first means so as to obtain a predetermined magnitude of the corresponding first parameter. The computer means is designed to ascertain whether the predetermined magnitudes of the first parameters are correct for the predetermined size of the original to be copied. The computer means is further designed such that, when all predetermined magnitudes of the first parameters are correct, the computer means enables and controls manipulation of each second means so as to obtain respective predetermined magnitudes of the second parameters which are correct for the predetermined size of the original to be copied. The computer means is also designed to generate a warning signal when a predetermined magnitude of at least one first parameter is incorrect for the predetermined size of the original.

Another aspect of the invention resides in a method of copying originals, particularly photographic originals, having a range of sizes. The method comprises the following steps:

(a) Conveying an original of predetermined size towards a copying station.

(b) Manually adjusting a first parameter which is a function of size so as to obtain a predetermined magnitude of the first parameter.

(c) Ascertaining whether the predetermined magnitude of the first parameter is correct for the predetermined size of the original.

(d) Generating a warning signal when the predetermined magnitude of the first parameter is incorrect for the predetermined size of the original.

(e) Automatically adjusting a second parameter which is a function of size so as to obtain a correct predetermined magnitude of the second parameter for the predetermined size of the original. The automatic adjusting step is performed only when the predetermined magnitude of the first parameter is correct for the predetermined size of the original.

(f) Copying the original subsequent to the automatic adjusting step.

In accordance with the invention, the procedures for adjusting a copier to originals of different dimensions are divided into manual procedures and automatic procedures. Those adjustments which can be performed with relative ease by manual interchange of components or manual displacement of a component are carried out manually. On the other hand, those adjustments which are suitably carried out in a continuous, motorized fashion are performed automatically. In this manner, an optimum cost may be achieved for each adjustment. Furthermore, by generating indicator signals which represent the conditions of the manually controlled means or components, it becomes possible to monitor the various adjustments with a computer. The computer enables adjustment of the motorized means or components only when all of the manually controlled means or components have assumed mutually compatible conditions or positions.

Throughout the description and claims, the term "adjustment" is taken to include a procedure in which one component is substituted for another having the same function but designed for material of different dimensions.

The novel features which are considered as characteristic of the invention are set forth in particular in the appended claims. The improved copier itself, however, both as to its construction and its mode of operation, together with additional features and advantages thereof, will be best understood upon perusal of the following detailed description of certain specific embodiments when read in conjunction with the accompanying drawings.

DESCRIPTION OF THE PREFERRED EMBODIMENTS

Figure 1:
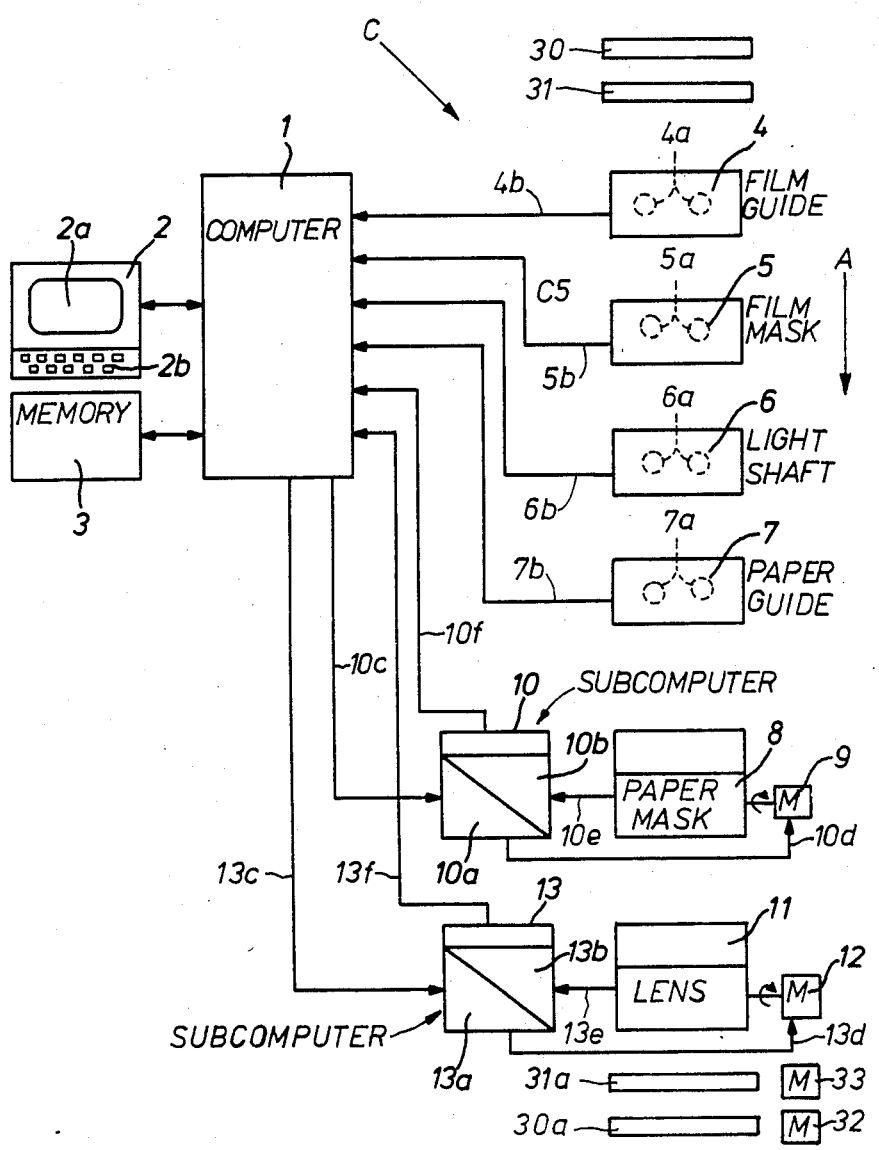
FIG. 1 is a block diagram of a copier according to the invention.

Referring to FIG. 1, the reference character C generally identifies a copier in accordance with the invention. The copier C is here assumed to be a photographic copier, that is, a copier designed to make copies of photographic originals such as, for example, negatives obtained by exposing film.

The copier C is designed to copy originals having different sizes, i.e. different widths and/or lengths, onto copying material or paper having different widths. Furthermore, the copier C is assumed to be of the type in which the originals and the copying material are supplied from rolls. To this end, the copier C has a core or other suitable support means 31 for rotatably supporting rolls of originals which have various dimensions. The copier C further has a second core or other suitable support means 31a to which the leading end of a roll of originals on the core 31 is connected. The core 31a is driven by a motor or conveying means 33 which serves to advance the originals in the direction of the arrow A through a copying station C5. As the originals are advanced, the originals are unwound from the roll on the core 31 upstream of the copying station C5, and rewound into a roll on the core 31a downstream of the copying station C5.

The copier C also has a core or other suitable support means 30 for rotatably supporting rolls of copying material having different widths. In addition, the copier C has a core or other suitable support means 30a which is connected with the leading end of a roll of copying material on the core 30. The core 30a is driven by a motor or conveying means 32 via which the copying material is advanced in the direction of the arrow A through the copying station C5. During advancement, the copying material unwinds from the roll on the core 30 upstream of the copying station C5, and is rewound into a roll on the core 30a downstream of the copying station C5.

Referring still to FIG. 1, the reference numeral 1 identifies a computer which is here assumed to be in the form of a microprocessor with internal memory. By way of example, microprocessor 8085 of Intel may be used for the computer 1. The computer 1 is connected with a terminal 2 having a screen 2a, as well as a keyboard 2b for controlling the operation of the copier C. The computer 1 is further connected with an external memory 3 having a drive for a magnetic disc. The memory 3 stores data relating the various sizes of the originals to parameters of the copier C.

The copier C has a manually controlled first means or unit 4 for changing the magnitude of a first parameter of the copier C; another manually controlled first means or unit 5 for changing the magnitude of another first parameter of the copier C; a further manually controlled first means or unit 6 for changing the magnitude of a further first parameter of the copier C; and an additional manually controlled first means or unit 7 for changing the magnitude of an additional first parameter of the copier C. The first means 4 is provided with indicator means 4a designed to engage corresponding sensor means mounted on the copier C; the first means 5 is provided with indicator means 5a designed to engage corresponding sensor means mounted on the copier C; the first means 6 is provided with indicator means 6a designed to engage corresponding sensor means mounted on the copier C; and the first means 7 is provided with indicator means 7a designed to engage corresponding sensor means mounted on the copier C. The sensor means for the indicator means 4a is connected with an input of the computer 1 via conductor means 4b; the sensor means for the indicator means 5a is connected with an input of the computer 1 via conductor means 5b; the sensor means for the indicator means 6a is connected with an input of the computer 1 via conductor means 6b; and the sensor means for the indicator means 7a is connected with an input of the computer 1 via con-ductor means 7b. When the indicator means 4a engages the corresponding sensor means, the computer 1 receives an indicator signal representative of the magnitude of the first parameter associated with the first means 4; when the indicator means 5a engages the corresponding sensor means, the computer 1 receives an indicator signal representative of the magnitude of the first parameter associated with the first means 5; when the indicator means 6a engages the corresponding sensor means, the computer 1 receives an indicator signal representative of the magnitude of the first parameter associated with the first means 6; and when the indicator means 7a engages the corresponding sensor means, the computer 1 receives an indicator signal representative of the magnitude of the first parameter associated with the first means 7.

The first means 4 comprises a set of interchangeable guide plates for the originals. The different guide plates are designed to guide originals having different widths. Each of the guide plates is provided with a slot which is transverse to the direction indicated by the arrow A and extends across the path of travel of the originals. The guide plates are designed for use at a scanning station, and the purpose of the slots is to permit measurement of the transmissivities of the originals. The transmissivity measurements for each original may be performed at a multiplicity of discrete regions thereof. A scanning system which may be used in the copier C is disclosed in detail in the commonly owned West German patent application Ser. No. P33 39 958 filed Nov. 4, 1983.

The disclosure of this commonly owned patent application incorporated herein by reference. One of the slotted guide plates is substituted for another when the width of the original to be copied changes. The indicator means 4a is here in the form of one or more prongs located at the underside of each guide plate. When a guide plate is installed in the copier C so that its prongs engage the corresponding sensor means, the computer 1 receives an indicator signal identifying the width of the originals for which the guide plate is designed. The first parameter associated with the first means 4 is thus the dimensions of the guide plates and/or the slots.

The first means 5 is designed for use at the copying station C5 and includes a set of interchangeable masks for the originals. Each of the masks is in the form of a plate having a cutout which is dimensioned for originals of a particular size. For instance, the first means 5 may comprise a mask for negatives obtained from each of the following types of film: (i) 110 mm; (ii) 126 mm; (iii) 135 mm; (iv) 18 mm×24 mm; (v) 24 mm×24 mm; and (vi) 24 mm×36 mm. The underside of each mask is formed with an indicator means 5a, and the respective indicator means 5a are coded in such a manner that, when the indicator means 5a of a mask engages the corresponding sensor means, the computer 1 receives an indicator signal identifying the dimensions of the originals for which the mask is designed. Accordingly, the first parameter associated with the first means 5 is the dimensions of the masks and/or the cutouts. An example of a support which may be used for the originals and is provided with interchangeable masks for different dimensions is described in detail in the commonly owned West German Pat. No. 26 59 449 which corresponds to U.S. Pat. No. 4,240,744. The disclosure of these patents are incorporated herein by reference.

In copiers of the type where the originals and the copying material are supplied from rolls, it is highly desirable to fully utilize the light generated in the lamp house for copying. Consequently, the cross section of the outlet aperture of the mixing element disposed between the lamp house and the support for the originals is advantageously adjusted to the size of the original being copied. To this end, it has become known to provide copiers with a set of interchangeable reflector shafts or tubes, which may also be referred to as light shafts or tubes, having outlet apertures with different cross sections. An alternative arrangement of different reflector shafts or tubes is disclosed in detail in the West German Pat. No. 24 51 892 and the corresponding U.S. Pat. No. 4,009,383. The disclosures of these patents are incorporated herein by reference. In the alternative arrangement, different reflector shafts or tubes are disposed one inside the other in such a manner that three different shaft configurations may be obtained by a simple shifting motion.

The first means 6 comprises one of the preceding arrangements of reflector shafts or tubes. When an indicator means 6a engages the corresponding sensor means, the computer 1 receives an indicator signal identifying the dimensions of the originals for which the reflector shaft arrangement is set. The first parameter associated with the first means 6 may thus be considered to be the cross-sectional dimensions or areas of the outlet apertures of the reflector shaft arrangement.

The width of the copying material or paper constitutes another important adjustment to be made for the copier C. A system for adjusting the width of the copying material is described in the commonly owned West German patent application Ser. No. P33 39 617.5 filed Nov. 4, 1983.

The disclosure of this patent application is incorporated herein by reference. In this system, an apertured locating element is freely shiftable on a guide. The locating element is fixed to lateral guide surfaces for the copying material. The frame of the copier is provided with appropriate marks by means of which the unit consisting of the locating element and the lateral guide surfaces can be brought into the proper position for copying material of a given width. Once the unit has been properly positioned for the particular width of the copying material, the unit is locked in position by a straight masking band which is placed on the unit from above. The masking band is mounted in the frame of the copier and is formed with locator holes. Different masking bands are employed for different widths of copying material, and the various masking bands for the copying material are interchangeable.

The first means 7 comprises a unit having a locating element which is connected with lateral guide surfaces for the copying material, and further comprises a set of interchangeable masking bands for locking the unit in position. The indicator means 7a here again is in the form of one or more prongs provided on each of the masking bands. When a masking band is in operating position so that its prongs engage the corresponding sensor means which is fixed relative to the frame of the copier C, the computer 1 receives an indicator signal identifying the width of copying material for which the masking band is designed and the unit is set. The first parameter associated with the first means 7 is the position of the unit including the locating element and the lateral guide surfaces for the copying material.

It will be recalled at this point that each of the first means 4–7 is manually controlled. The condition of each first means 4–7 may be changed either by manual shifting of a component or manual substitution of one component for another.

In addition to the manually controlled first means 4–7, the copier C comprises an automatically regulated or motorized second means or unit 8 for changing the magnitude of a second parameter of the copier C; and another automatically regulated or motorized second means or unit 11 for changing the magnitude of another second parameter of the copier C.

The second means 8 functions to regulate the lengths of the images of the originals formed on the copying material. A motor 9 is connected with the second means 8 and drives the same via an adjusting spindle. A suitable system for adjusting the lengths of the images of the originals is detailed in the previously mentioned commonly owned West German patent application Ser. No. P33 39 617.5 filed Nov. 4, 1983.

Thus, the second means 8 may include a mask which is shiftable lengthwise of the copying material, that is, along the direction indicated by the arrow A.

The motor 9 is controlled by a subcomputer 10 which is divided into two sections 10a and 10b. The section 10a is connected with an output of the computer 1 by conductor means 10c through which the computer 1 supplies the section 10a with the desired image length, i.e. the desired position of the shiftable mask. The motor 9 is controlled accordingly via conductor means 10d leading from an output of the section 10a to the motor 9. The section 10b of the subcomputer 10 receives data on the instantaneous image length, i.e. the instantaneous position of the shiftable mask, through the agency of conductor means 10e connecting the section 10b with detector means capable of generating signals representative of the instantaneous image length. The detector means may, for example, comprise a slotted disc which is mounted for rotation with the adjusting spindle for the shiftable mask. The position of a slot in the disc is then an indicator of the image length, and may be sensed in any suitable manner, e.g. photoelectrically. The section 10b is further connected with an input of the computer 1 via conductor means 10f. The motor 9 and the two sections 10a, 10b of the subcomputer 10 together constitute a control unit in which the desired and instantaneous image lengths are continuously compared. Since the desired image length is programmed into and thus known from the computer 1, the image length upon completion of adjustment of the second means 8 is known. The second parameter associated with the second means 8 may be considered to be the position of the shiftable mask at least in part constituting the second means 8.

The second means 11 comprises an objective having a variable focal length. In order to change the focal length, the objective is provided with movable lens elements. Preferably, the objective is designed with two lens elements which are shiftable axially of the objective. The lens elements are connected with motors 12 via adjusting spindles, and the motors 12 are arranged to move the lens elements relative to one another and relative to an original to be copied so as to obtain the desired magnification of the image of the original. A suitable system for changing the magnification of an objective having movable lens elements is detailed in the commonly owned West German patent application Ser. No. P33 39 960.3 filed Nov. 4, 1983 and corresponding to U.S. patent application Ser. No. 663,991 filed Oct. 22, 1984.

The motors 12 are controlled by a subcomputer 13 which is divided into two sections 13a and 13b. The section 13a is connected with an ouput of the computer 1 by conductor means 13c through which the computer 1 supplies the section 13a with the desired magnification, i.e. the desired positions of the lens elements. The motors 12 are controlled accordingly via conductor means 13d leading from an output of the section 13a to the motors 12. The section 13b of the subcomputer 13 receives data on the instantaneous magnification, i.e. the instantaneous positions of the lens elements, through the agency of conductor means 13e connecting the section 13b with detector means capable of generating signals representative of the instantaneous magnification. The detector means may, for example, include slotted discs which are mounted for rotation with the adjusting spindles for the lens elements. The positions of slots in the discs are then an indicator of magnification, and may be sensed in any suitable manner, e.g. photoelectrically. The section 13b is further connected with an input of the computer 1 via conductor means 13f. The motors 12 and the two sections 13a, 13b of the subcomputer 13 together constitute a control unit in which the desired and instantaneous magnifications are continuously compared. The second parameter associated with the second means 11 may be considered to be the focal length or magnification of the objective, or the relative position of the lens elements.

Figure 2:
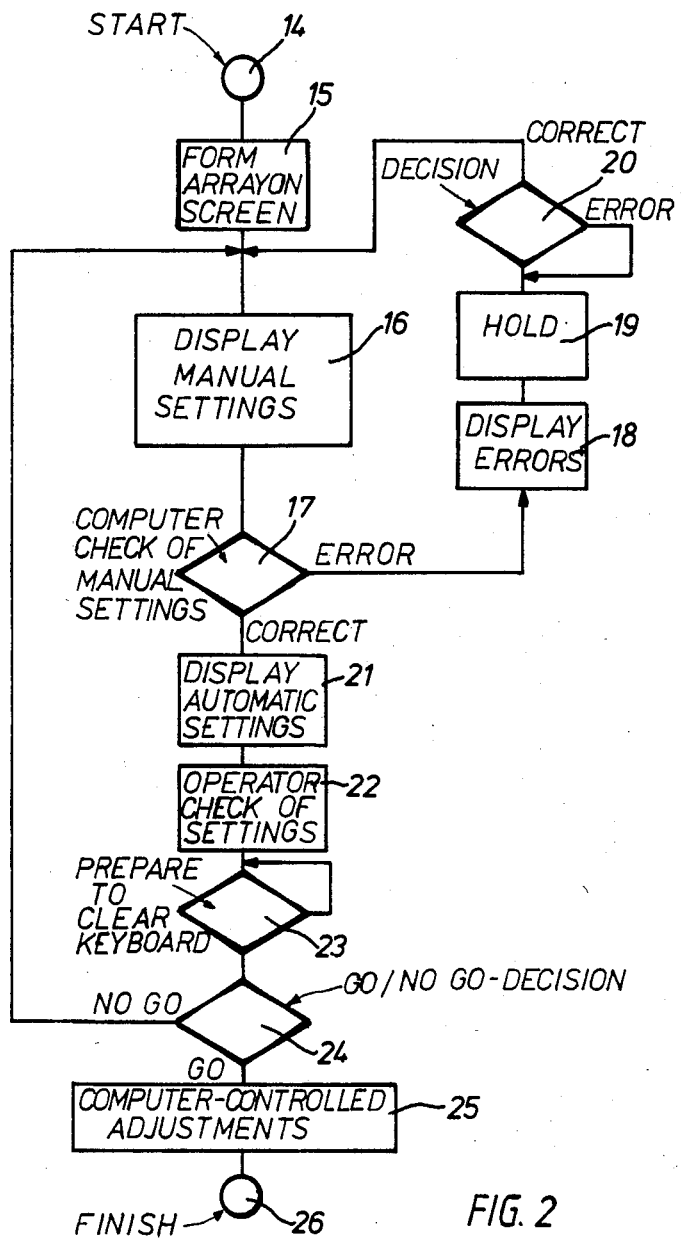
FIG. 2 is a flow diagram illustrating a procedure for adjusting the copier of FIG. 1.

The operation of adjusting the copier C when the size of an original to be copied changes will be explained with reference to the flow diagram of FIG. 2.

The numeral 14 identifies the starting point which is arrived at by punching appropriate keys on the keyboard 2b of the terminal 2. Next, an array for carrying out the adjustment procedure is formed on the screen 2a of the terminal 2. This is indicated as operation 15.

If not done previously, the manually controlled first means 4-7 are now adjusted. The computer 1 then scans the first means 4-7, and the following first parameters are then displayed as indicated at operation 16: (i) the type or dimensions of the guide plate which is to be used during scanning of the original and constitutes part of the first means 4; (ii) the type or dimensions of the mask which is to be used for masking the original during copying and constitutes part of the first means 5; (iii) the type of light shaft, or the cross-sectional area of the outlet aperture of the light shaft, which is to be used for illuminating the original during copying and at least in part constitutes the first means 6; and (iv) the position of the guide unit which is used for the copying material and at least in part constitutes the first means 7.

As shown at operation 17, the computer 1 now ascertains whether the four manually obtained settings are meaningful within any of the possible set-ups or configurations of the copier C. In other words, the computer 1 checks whether the combination of the four manual settings can exist during copying of any original having a size intended to be handled by the copier C onto copying material having any width intended to be handled by the copier C and to be used for an original of such size. To this end, the memory 3 contains all combinations of settings for the first means 4-7 and the second means 8,11 which can occur for the contemplated combinations of copying material width and original size. The computer 1 scans the different combinations of settings in steps to determine whether the combination of manual settings displayed during operation 16 is one of the practical combinations according to the memory 3.

If the computer 1 determines that one or more of the manual settings are in error, the computer 1 proceeds to operation 18 in which an error text is displayed. The display of an error text may be considered to constitute a warning signal. The computer 1 is programmed in such a manner that the selected mask of the first means 5 is always taken to be correct. The reason is that, as a rule, the operator of the copier C is aware of the dimensions of the original to be copied and knows precisely which mask is required. Accordingly, the error text displayed during operation 18 identifies those of the first means 4, 6 and 7 which are not compatible with the selected mask of the first means 5.

After the error text has been displayed, the computer 1 holds for a certain time interval, e.g. one second. This is indicated as operation 19. The hold interval affords the operator of the copier C an opportunity to correct any of the manual settings shown to be erroneous. For instance, if the first means 6 comprises a set of interchangeable light shafts and an improper light shaft was inserted by the operator, the hold interval permits the operator to replace the improper light shaft. During the hold interval, the computer 1 undertakes a decision process which is identified as operation 20 and functions only as a delaying process to achieve the hold interval of operation 19.

Upon termination of the hold interval, the computer 1 returns to operation 16 where the corrected manual settings are displayed. The computer 1 then proceeds once more to operation 17 during which the computer 1 determines whether the manual settings were corrected in such a manner that they appear to be compatible or whether an error is still present. If an error remains, the computer 1 returns to operation 18.

Once all errors in the manual settings have been eliminated, or if no errors were present initially, the settings for the motorized second means 8 and 11 are inserted in the display formed during operation 16. Thus, the following second parameters are added to the display: (i) the length of copying material to be exposed or the position of the shiftable mask which at least in part constitutes the second means 8 and regulates such length; and (ii) the magnification of the image of the original or the relative position of the lens elements at least in part constituting the second means 11. Insertion of the settings for the motorized second means 8, 11 in the display formed during operation 16 is identified as operation 21. The settings for the motorized second means 8,11 are derived directly from the memory 3 based upon the dimensions of the original to be copied and the width of the copying material to be used.

As indicated at operation 22, the operator of the copier C now has the opportunity to check whether the settings displayed for the first means 4-7 and the second means 8,11 are in conformance with the result to be achieved. In the next operation shown at 23, the keyboard 2b of the terminal 2 is prepared to be cleared. If the operator is satisfied with the settings on display, the operator makes a "GO" decision at operation 24 and punches "Yes" into the computer 1. The computer 1 now enables adjustment of the shiftable mask which at least in part constitutes the second means 8, and the objective which at least in part constitutes the second means 11. Adjustment of the shiftable mask and the objective is effected automatically by the computer 1 which controls the adjustment of each. The final settings of the shiftable mask and the objective are those displayed during operation 21. Since, as indicated above, the settings for the second means 8,11 are derived directly from the memory 3 based upon the dimensions of the original to be copied and the width of the copying material to be used, the final settings of the shiftable mask and the objective are correct for the dimensions of the original to be copied. Adjustment of the shiftable mask and the objective is identified as operation 25. Simultaneously with adjustment of the shiftable mask and the objective, the settings displayed during operation 21 are incorporated into the processing sequence of the computer 1 for continuous routine checks.

Once the shiftable mask and the objective have assumed their final settings, the adjustment procedure for the copier C is completed as indicated at 26.

If the operator disagrees with the settings displayed for the first means 4–7 and the second means 8,11, the operator makes a "NO GO" decision at operation 24 and punches "No" into the computer 1. The computer 1 then does not enable adjustment of the second means 8,11, and returns to operation 16 where the settings for the first means 4–7 are displayed. It will be recalled that these are actual settings which were manually obtained earlier. The operator now has the opportunity to begin a new combination of settings, e.g. by interchanging the mask which is to be used for masking the original and constitutes part of the first means 5, or by changing the position of the guide unit which is used for the copying material and at least in part constitutes the first means 7. It is, of course, possible that the settings for one or more of the first means 4,6,7 will no longer be compatible with the setting for the first means 5 once the setting of one or more of the first means 4–7 has been changed. In such an event, the computer 1 proceeds to operation 18, and the operator must make one or more additional changes.

The computer 1 is programmed in such a manner that the copying operation is automatically initiated upon completion of adjustment of the second means 8 and 11.

The copier C may be provided with adjustable means other than those described above. For instance, it is possible to provide a set of interchangeable guide elements for guiding the copying material as this issues from a cassete confining a roll of the copying material.

The copier C may be assembled from conventional components.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A copier for originals, particularly photographic originals, having a range of sizes, said copier comprising:
   (a) a copying station;
   (b) a first support for rotatably supporting a roll of copying material;
   (c) first conveying means for advancing a roll of copying material through said copying station by unwinding the copying material upstream and rewinding the copying material downstream of said copying station;
   (d) a second support for rotatably supporting a roll of originals;
   (e) second conveying means for advancing a roll of originals through said copying station by unwinding the originals upstream and rewinding the originals downstream of said copying station;
   (f) a first guide for the copying material, said first guide being adjustable or interchangeable by hand, and said first guide being provided with first indicator means for generating a first signal characteristic of said first guide;
   (g) a second guide for the originals, said second guide being adjustable or interchangeable by hand, and said second guide being provided with second indicator means for generating a second signal characteristic of said second guide;
   (h) an adjustable device for regulating the size of the image of an original;
   (i) an adjustable objective; and
   (j) computer means arranged to receive the signals from said indicator means, said computer means being programmed to ascertain whether said first and second guides are compatible for copying an original of predetermined size and to generate a warning signal upon incompatibility, and said computer means being programmed to adjust said device and said objective when said first and second devices are compatible.

2. The copier of claim 1 comprising a set of interchangeable guides.

3. The copier of claim 1 comprising at least one manually controlled component which is movably mounted in said copier.

4. The copier of claim 1, wherein said adjustable device is designed to regulate the lengths of the images of the originals.

5. The copier of claim 1, wherein said adjustable device comprises a mask for regulating the lengths of the images of the originals.

6. The copier of claim 5, wherein the copying material is movable through said copying station along a predetermined path and said mask is movable lengthwise of said predetermined path.

7. The copier of claim 1, wherein said objective comprises a pair of adjusting elements movable axially of said objective.

8. The copier of claim 1, comprising masking means for the originals, said computer means being designed such that, when said masking means is incompatible with one of said guides, said computer means assumes said masking means to be correct and identifies said one guide.

9. The copier of claim 1, wherein said computer means is designed such that, when said guides are compatible, said computer means indicates the correct magnitudes of said device and said objective prior to adjustment of said device and said objective.

10. The copier of claim 9, wherein said computer means is designed to initiate adjustment of said device and said objective in response to an enabling signal from an operator.

11. Tne copier of claim 1, wherein said computer means is designed to initiate copying of the original upon termination of the adjustment of said device and objective.

12. The copier of claim 1 comprising, wherein said means designed to regulate the cross section of the beam which illuminates the original during copying.

13. A method of copying originals, particularly photographic originals, having a range of sizes, and method comprising the steps of:
   (a) conveying copying material through a copying station along a first path;
   (b) guiding said copying material in a portion of said first path;
   (c) establishing a first dimension for said portion of said first path by hand;
   (d) conveying an original of predetermined size through said copying station along a second path;
   (e) guiding said original in a section of said second path;

(f) establishing a second dimension for said section of said second path by hand;
(g) ascertaining whether said first and second dimensions are compatible for said predetermined size;
(h) generating a warning signal when said first and second dimensions are incompatible;
(i) automatically establishing a size for an image of said original, as well as a magnification factor for said original, when said first and second dimensions are compatible for said predetermined size; and
(j) copying said original subsequent to the automatic establishing step.

* * * * *